(12) United States Patent
Shibano et al.

(10) Patent No.: US 10,963,663 B2
(45) Date of Patent: Mar. 30, 2021

(54) FINGERPRINT SENSOR

(71) Applicant: Japan Display Inc., Tokyo (JP)

(72) Inventors: Fumihito Shibano, Tokyo (JP); Hiroshi Mizuhashi, Tokyo (JP); Toshinori Uehara, Tokyo (JP); Kimiyo Nonoyama, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/845,911

(22) Filed: Apr. 10, 2020

(65) Prior Publication Data

US 2020/0242318 A1 Jul. 30, 2020

Related U.S. Application Data

(63) Continuation of application No. 16/531,887, filed on Aug. 5, 2019, now Pat. No. 10,621,405, which is a continuation of application No. 15/469,755, filed on Mar. 27, 2017, now Pat. No. 10,372,961.

(30) Foreign Application Priority Data

Mar. 30, 2016 (JP) .................................. 2016-069293
Mar. 17, 2017 (JP) .................................. 2017-053516

(51) Int. Cl.
G06K 9/28 (2006.01)
G06K 9/00 (2006.01)

(52) U.S. Cl.
CPC .................................. G06K 9/0002 (2013.01)

(58) Field of Classification Search
CPC .................................................. G06K 9/0002
See application file for complete search history.

(56) References Cited

U.S. PATENT DOCUMENTS

| 7,835,553 | B2 | 11/2010 | Miyasaka |
| 2003/0016024 | A1 | 1/2003 | Teranuma et al. |
| 2004/0247163 | A1 | 12/2004 | Hara |
| 2011/0207257 | A1 | 8/2011 | Watanabe |
| 2013/0314105 | A1 | 11/2013 | Setlak et al. |

(Continued)

FOREIGN PATENT DOCUMENTS

| CN | 104850840 | 8/2015 |
| CN | 105138988 | 12/2015 |

(Continued)

OTHER PUBLICATIONS

Japanese Office Action dated Dec. 22, 2020 in corresponding Japanese Application No. 2017-053516.

*Primary Examiner* — Brian Werner
(74) *Attorney, Agent, or Firm* — K&L Gates LLP

(57) ABSTRACT

A fingerprint sensor is provided and includes a substrate; sensor electrodes arranged in a matrix on the substrate; switches coupled to the sensor electrodes; a control line drive circuit; a signal line drive circuit; signal lines coupling the signal line drive circuit to the sensor electrodes through the switches; control lines transmitting a selection signal to the switches from the control line drive circuit; and a sensor drive electrode surrounding the matrix of the sensor electrodes, wherein a distance of the sensor drive electrode from a surface of the substrate is larger than a distance of the sensor electrodes from the surface of the substrate.

5 Claims, 14 Drawing Sheets

(56) References Cited

U.S. PATENT DOCUMENTS

| | | |
|---|---|---|
| 2014/0333328 A1 | 11/2014 | Nelson et al. |
| 2015/0098140 A1 | 4/2015 | Lippert |
| 2016/0188032 A1 | 6/2016 | Lin |
| 2016/0224821 A1 | 8/2016 | Chang et al. |
| 2016/0239700 A1* | 8/2016 | Yang .................... G06K 9/0002 |
| 2016/0305796 A1 | 10/2016 | Wu et al. |
| 2016/0307019 A1 | 10/2016 | Zhang et al. |
| 2016/0342824 A1 | 11/2016 | Lee et al. |
| 2017/0053150 A1 | 2/2017 | Lee et al. |
| 2017/0145257 A1 | 5/2017 | Osada et al. |
| 2017/0262683 A1 | 9/2017 | Li et al. |
| 2018/0113558 A1* | 4/2018 | Cho .................... G06K 9/0002 |
| 2018/0114048 A1 | 4/2018 | Wang et al. |

FOREIGN PATENT DOCUMENTS

| | | |
|---|---|---|
| JP | 2004-317353 A | 11/2004 |
| JP | 2011-176229 | 9/2011 |
| WO | 2016/039037 | 3/2016 |

* cited by examiner

FINGERPRINT SENSOR

CROSS-REFERENCE TO RELATED APPLICATIONS

This application is a continuation application of U.S. patent application Ser. No. 16/531,887, filed on Aug. 5, 2019, which application is a continuation of U.S. patent application Ser. No. 15/469,755, filed on Mar. 27, 2017, which application claims priority from Japanese Application No. 2016-069293, filed on Mar. 30, 2016, and Japanese Application No. 2017-053516, filed on Mar. 17, 2017, the contents of which are incorporated by reference herein in its entirety.

BACKGROUND

1. Technical Field

The present invention relates to a fingerprint sensor, a fingerprint sensor module, and a method for manufacturing the fingerprint sensor.

2. Description of the Related Art

Recent years have seen development of, for example, high-resolution capacitance detection devices that can detect a microstructure, such as unevenness of a surface of a finger, as a way of biometric authentication.

Of such devices, however, conventional fingerprint sensors are formed on a single-crystal silicon substrate, and hence are easily broken when pressed by a finger, which is a problem.

Japanese Patent Application Laid-open Publication No. 2004-317353 describes improvement in durability of a fingerprint sensor formed on an insulating substrate.

However, fingerprint sensors such as those described above have been required to be further improved in durability. The fingerprint sensors have also been required to have both high durability and high detection sensitivity.

For the foregoing reasons, there is a need for a fingerprint sensor with excellent durability, a module for the fingerprint sensor, and a method for manufacturing the fingerprint sensor. Furthermore, there is a need for a fingerprint sensor that achieves not only excellent durability but also excellent detection sensitivity, a module for the fingerprint sensor, and a method for manufacturing the fingerprint sensor.

SUMMARY

According to an aspect, a fingerprint sensor includes a first glass substrate, a second glass substrate, and a plurality of sensor electrodes between the first glass substrate and the second glass substrate. The first glass substrate and the second glass substrate are bonded together by a sealing material with the plurality of sensor electrodes interposed therebetween.

DETAILED DESCRIPTION

Figure 1:
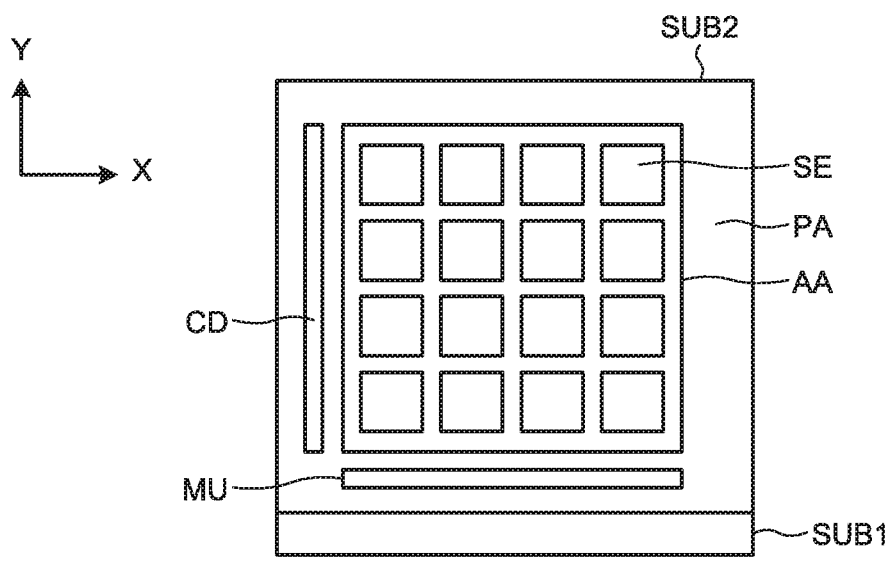
FIG. 1 is a plan view of a fingerprint sensor according to an embodiment of the present invention.

The following describes an embodiment for carrying out the present invention. The present invention is not limited to the description of the embodiment to be given below. Components to be described below include those easily conceivable by those skilled in the art, and those substantially the same. The components to be described below can be combined as appropriate. The present disclosure is merely an example, and includes those that can be appropriately modified or easily conceivable by those skilled in the art. To further clarify the description, widths, thicknesses, shapes, and the like of various parts may be schematically illustrated in the drawings as compared with actual aspects thereof. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

1-1. Overall Configuration

FIG. 1 is a plan view illustrating a configuration example of a fingerprint sensor according to the present embodiment.

The fingerprint sensor 1 includes a first glass substrate SUB1, a second glass substrate SUB2, sensor electrodes SE, control lines C1, signal lines S1, a control line drive circuit CD, a signal line drive circuit MU, a detection region AA, and a frame region PA. The sensor electrodes SE are formed above the first glass substrate SUB1, above which the second glass substrate SUB2 is stacked. That is, the fingerprint sensor 1 has a structure in which the sensor electrodes SE are interposed between the two glass substrates.

The first and the second glass substrates SUB1 and SUB2 are bonded together with a sealing material (not illustrated).

The fingerprint sensor 1 includes the sensor electrodes SE arranged thereon, and is provided with the detection region AA for detecting a fingerprint or the like, and with the frame region PA outside the detection region AA. The sensor electrodes SE for the fingerprint detection are interposed between the two glass substrates, and the glass substrates are bonded together, so that the sensor electrodes SE can be physically and chemically protected and prevented from deformation and breakage when pressed from above. Such a fingerprint sensor is more durable than fingerprint sensors protected by, for example, a resin film.

When the sensor electrodes SE are protected by being interposed between members such as an insulating substrate and a resin film having a large difference in linear expansion coefficient, the fingerprint sensor is warped due to the difference in the linear expansion coefficient under high temperature conditions or low temperature conditions. However, bonding the two glass substrates with the sensor electrodes SE interposed therebetween can prevent the warp of the sensor.

It is preferable that the first and the second glass substrates SUB1 and SUB2 are formed of the same material having an equal linear expansion coefficient, so that the warp of the sensor can be further prevented.

Employing the structure of interposing the sensor electrodes SE between the two glass substrates allows the glass substrates to be controlled in thickness, for example, using a wet etching method. As a result, the glass of the fingerprint sensor is easily reduced in thickness. That is, bonding the two glass substrates with the sensor electrodes SE interposed therebetween can simultaneously achieve a reduction in thickness of the fingerprint sensor and prevention of the warp of the fingerprint sensor. If a glass substrate disposed between the sensor electrodes SE and a finger is too thick, the detection sensitivity of the fingerprint sensor drops. However, the present embodiment can provide the fingerprint sensor 1 having excellent detection sensitivity. If the glass substrate disposed between the sensor electrodes SE and the finger is too thin, the durability of the fingerprint sensor drops in some cases. However, the present embodiment enables easy control of the film thickness of the glass substrate, and thus can provide the fingerprint sensor 1 having desired durability. The shapes of the glass substrates SUB1 and SUB2 and the shapes of the detection region AA and the frame region PA are not limited to the illustrated shapes thereof, and may be square, rectangular, circular, or polygonal.

The sensor electrodes SE are arrayed in the detection region AA of the first glass substrate SUB1, and the signal line drive circuit MU and the control line drive circuit CD are disposed in the frame region PA. The sensor electrodes SE are formed in a matrix so as to have a plurality of patterns arrayed in the X-direction and the Y-direction at least in the detection region AA. Each adjacent pair of the sensor electrodes SE is divided by a slit. To detect a microstructure, such as a fingerprint, the sensor electrodes SE arranged in the detection region AA are preferably arranged at a density of 250 to 1000 pixels per inch (PPI) when converted such that each of the sensor electrodes SE corresponds to a pixel. This arrangement allows the sensor electrodes SE to have a resolution corresponding to a pixel resolution in a range of 250 to 1000 PPI.

The signal line drive circuit MU supplies drive signals for the fingerprint detection to the sensor electrodes SE through the signal lines S1, or outputs a detection signal for the fingerprint detection. The signal lines S1 extend in the Y-direction and are arrayed in the X-direction at least in the detection region AA. Each of the signal lines S1 is disposed so as to correspond to the respective sensor electrodes SE in at least one column extending in the Y-direction. The signal line drive circuit MU selects the signal line S1 for the drive and detection according to a predetermined selection signal. The signal line drive circuit MU includes a selection circuit such as a multiplexer circuit.

The control line drive circuit CD supplies a selection signal through each of the control lines C1 to select sensor electrodes SE to be driven. The control lines C1 extend in the X-direction and are arrayed in the Y-direction at least in the detection region AA. Each of the control lines C is disposed so as to correspond to the respective sensor electrodes SE in at least one predetermined row of the sensor electrodes SE extending in the X-direction. The control line drive circuit CD includes a transfer circuit such as a shift register circuit, and a selection circuit such as a decoder circuit.

Figure 2:
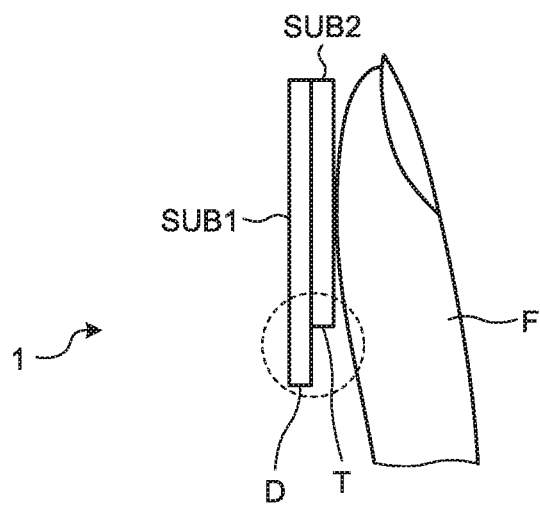
FIG. 2 is a side view of the fingerprint sensor according to the embodiment.

FIG. 2 is a side view illustrating a configuration of the fingerprint sensor according to the present embodiment. As illustrated in FIG. 2, when a finger F above the second glass substrate SUB2 is in proximity thereto or in contact therewith, a sensor electrode (not illustrated) formed on the first glass substrate SUB1 detects the fingerprint of the finger.

In the present embodiment, the main surface of the second glass substrate SUB2 has a smaller area than that of the first glass substrate SUB1. A step D is formed near an end T of the second glass substrate SUB2. For example, signal wiring, a flexible substrate, and a terminal (connector) can be disposed in a region of the first substrate where the second substrate does not overlap the first substrate thereabove.

The fingerprint sensor of the present embodiment can be easily reduced in size, thickness, and weight, and can have excellent durability and high detection sensitivity. The fingerprint sensor of the present embodiment can be built into a credit card or the like to provide a card with a fingerprint authentication function. That is, the fingerprint sensor of the present embodiment can be used as a thin sensor or a compact sensor with high resolution.

At least one of the first glass substrate SUB1 and the second glass substrate SUB2 of the fingerprint sensor according to the present embodiment preferably has a thickness in the range of 100 µm to 300 µm. If the thickness is smaller than 100 µm, the durability of the fingerprint sensor drops in some cases. If the thickness exceeds 300 µm, the sensitivity of the fingerprint sensor drops in some cases. Every side of the first and the second glass substrates SUB1 and SUB2 of the fingerprint sensor according to the present embodiment preferably has a length in the range of 5 mm to 30 mm. If one side of the glass substrates is 5 mm or smaller in length, the resolution of the fingerprint detection is insufficient in some cases. If one side of the glass substrates exceeds 30 mm in length, the fingerprint sensor increases in size in some cases.

1-2. Configuration Example of Fingerprint Sensor

Figure 3:
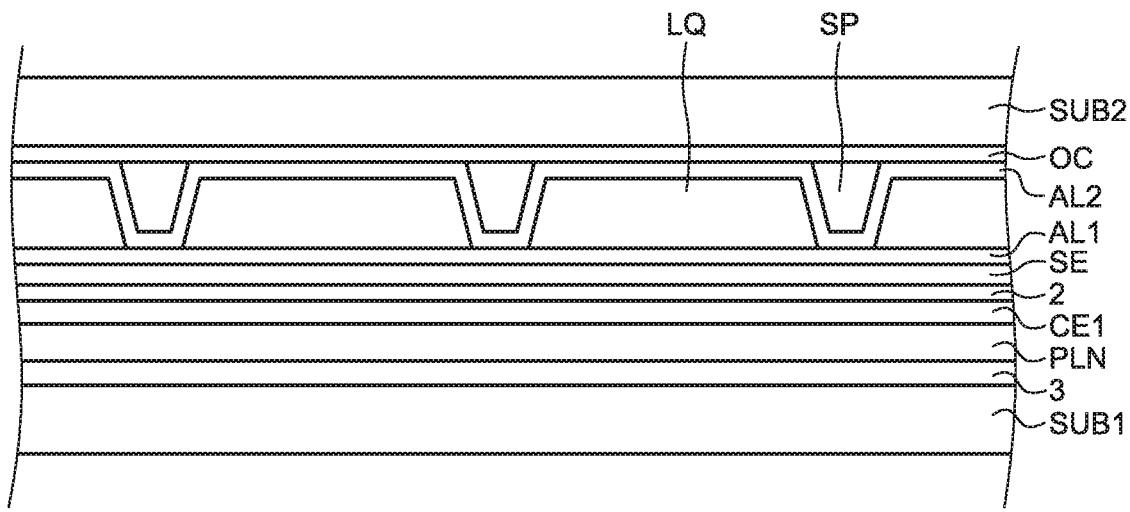
FIG. 3 is a sectional view of the fingerprint sensor according to the embodiment.

FIG. 3 is an exemplary schematic sectional view of the fingerprint sensor 1 according to the embodiment.

A sensor circuit 3 is formed on the first glass substrate SUB1. The sensor circuit 3 includes wiring (not illustrated), such as control lines and signal lines, and switch elements that supply the drive signals from the signal lines to the sensor electrodes SE according to control signals supplied from the control lines. A planarizing film PLN is formed on the sensor circuit 3. The planarizing film PLN is formed of an organic material such as an acrylic resin. Using an organic material allows the planarizing film PLN to have a larger film thickness. This can reduce parasitic capacitances between the sensor electrodes SE and the sensor circuit 3 and between a first counter electrode CE1 and the sensor circuit 3, and thus enables improvement in the detection speed and the detection sensitivity of the sensor, and reduction in electric power consumption.

The first counter electrode CE1 facing the sensor electrodes SE is formed on the planarizing film PLN. The first counter electrode CE1 has a function as, for example, a guard electrode. In a high-resolution input detection device, such as the fingerprint sensor, that recognizes a microstructure, a larger number of the small sensor electrodes SE are densely arranged in the detection region, thereby necessitating a drive circuit, a selection circuit, and control wiring for sequentially driving the sensor electrodes SE. Therefore, the guard electrode is disposed between the sensor circuit including such circuits and wiring and the sensor electrodes SE so that noise and the parasitic capacitances can be reduced. The first counter electrode CE1 is formed of a conductive layer of, for example, indium tin oxide (ITO), and is formed into, for example, a solid pattern shape covering at least the entire surface in the detection region AA in which the sensor electrodes SE are arranged. The first counter electrode CE1 may, however, have a shape divided into a plurality patterns. The first counter electrode CE1 may be formed of ITO, a light-transmitting conductive material, such as indium zinc oxide (IZO) and zinc oxide (ZnO), or a light-blocking conductive material, such as a metal. It is preferable that the first counter electrode CE1 faces the sensor electrodes SE so as to cover the entire detection region AA, because the guard effect is improved.

The first counter electrode CE1 may be set to a floating potential, or may be supplied with a predetermined potential. While an active guard potential supplied to the first counter electrode CE1 is not limited, a higher effect of reducing the parasitic capacitances between the sensor electrodes SE and the sensor circuit 3 is preferably obtained by supplying a signal having the same phase as that of the drive signal supplied to each of the sensor electrodes SE to the first counter electrode CE1 at the same timing as the timing of supplying the drive signal to the sensor electrodes SE. The guard signal synchronized with the drive signal of the sensors in this manner is at the active guard potential. The voltage of the signal at the active guard potential only needs to have the same phase as that of the drive signal of the sensors. It is more preferable to use the active guard potential having the same waveform with the same phase and the same amplitude as those of the drive signal.

An insulating film 2 is formed on the first counter electrode CE1, and the sensor electrodes SE are formed on the insulating film 2. The sensor electrodes SE are formed of, for example, ITO. The sensor electrodes SE may be formed of IZO, ZnO, or metal films. An alignment film AL1 is formed on the sensor electrodes SE.

An overcoat layer (protection layer) OC is formed on the second glass substrate SUB2. A spacer SP is formed on the overcoat layer OC. An alignment film AL2 is formed on the spacer SP. A liquid crystal layer LQ is disposed between the alignment film AL1 and the alignment film AL2. That is, a gap formed between the first and the second glass substrates SUB1 and SUB2 is filled with liquid crystals of the liquid crystal layer LQ. The first and the second glass substrates SUB1 and SUB2 are bonded together in the frame region PA, so that a vacuum layer or an air layer is included between the glass substrates unless the liquid crystals are injected in the gap between the glass substrates. If the vacuum layer or the air layer is interposed between the sensor electrodes SE and the substrate (second glass substrate SUB2 in the present embodiment) touched by the finger, the detection sensitivity of the fingerprint sensor drops in some cases. Therefore, the vacuum layer or the air layer is preferably filled with a filler material, such as the liquid crystals. As will be described later, the gap between the first and the second glass substrates SUB1 and SUB2 may be filled with the sealing material.

To prevent the liquid crystals injected between the first and the second glass substrates SUB1 and SUB2 from leaking out, and to prevent air from entering the gap between the first and the second glass substrates SUB1 and SUB2 from the outside, the first and the second glass substrates SUB1 and SUB2 are preferably bonded together without a gap, i.e., sealed by the sealing material.

Figure 4:
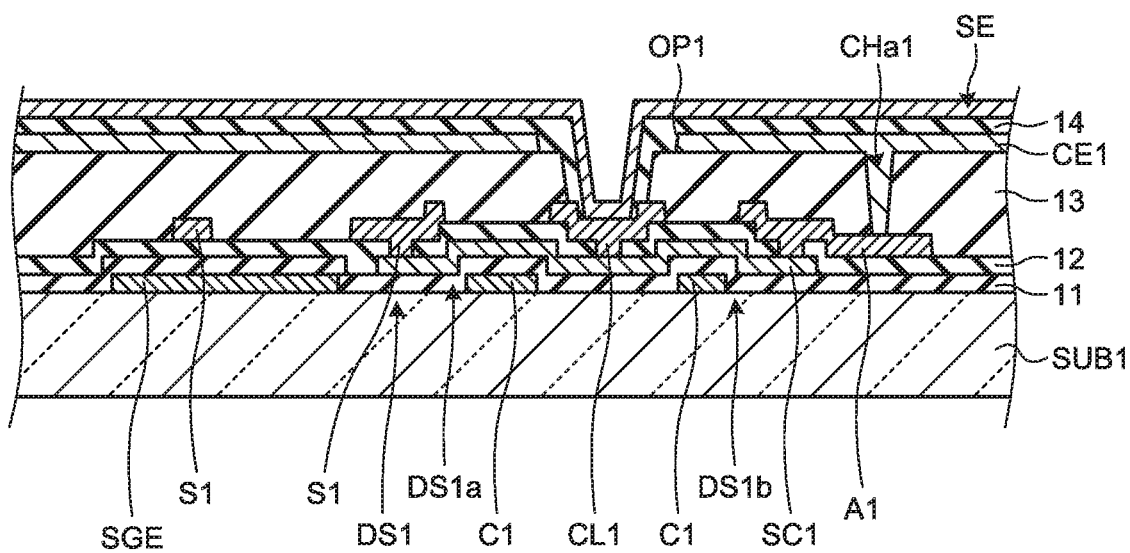
FIG. 4 is a partially enlarged view of the sectional view of the fingerprint sensor according to the embodiment.

FIG. 4 is an exemplary enlarged view of the sensor circuit formed on the first glass substrate SUB1. FIG. 4 is an enlarged schematic diagram of a sectional view of the fingerprint sensor of FIG. 1 taken along the line in the X-direction. As illustrated in FIG. 4, each of the control lines C1 and a sub-guard electrode SGE are formed on the first glass substrate SUB1. The control line C1 and the sub-guard electrode SGE may be directly formed on the first glass substrate SUB1, or may be formed with an insulating film or the like interposed therebetween. The sub-guard electrode SGE is disposed between the signal line S1 and the first glass substrate SUB1, and is formed of the same conductive material, such as a metal, as that of the control line C1. A first insulating film 11 is formed above the control line C1 and the sub-guard electrode SGE. A first semiconductor layer SC1 is formed on the first insulating film 11. The first semiconductor layer SC1 includes two channel regions facing the control lines C1. The first semiconductor layer SC1 is located on a side of the first counter electrode CE1 opposite to the sensor electrodes SE. The first semiconductor layer SC1 is formed of, for example, polycrystalline silicon. The semiconductor layer SC1 may be formed of oxide semiconductors or amorphous silicon. A second insulating film 12 is formed on the first insulating film 11 and the first semiconductor layer SC1.

The signal line S1, a first conductive layer CL1, and a first auxiliary wiring line A1 are formed on the second insulating film 12. The signal line S1, the first conductive layer CL1, and the first auxiliary wiring line A1 are located on the side of the first counter electrode CE1 opposite to the sensor electrodes SE. The signal line S1, the first conductive layer CL1, and the first auxiliary wiring line A1 are formed of the same conductive material, such as a metal.

The first auxiliary wiring line A1 is a wiring line for supplying the active guard potential to the first counter electrode CE1 through a contact hole CHa1.

The signal line S1 is coupled to one end of the first semiconductor layer SC1 through the contact hole CHa1 formed in the second insulating film 12.

Since the sub-guard electrode SGE is provided between the signal line S1 and the first glass substrate SUB1, it is possible to prevent noise from passing from the lower side of the first glass substrate SUB1 (from a surface thereof opposite to the surface above which the sensor electrodes SE are formed) to the signal line S1.

The signal lines S1 may be first formed above the first glass substrate SUB1, and the control lines C1 may be formed above the signal lines S1. In that case, the sub-guard electrode SGE is formed between the control lines C1 and the first glass substrate SUB1. The sub-guard electrode SGE may be formed in the same layer as that of the signal lines S1, or may be formed of the same material as that of the signal lines S1.

The active guard potential can be supplied to the sub-guard electrode SGE through the first auxiliary wiring line A1. Although the active guard potential is not limited to a particular range, supplying the active guard potential in synchronization with the drive signal of the sensor electrodes SE can further reduce the parasitic capacitances between the signal lines S1 and the sensor electrodes SE, and between the control lines C1 and the sensor electrodes SE. If, in addition to the first counter electrode CE1, such an auxiliary shield electrode is further provided at a location closer to the first glass substrate SUB1, a higher reduction effect of the parasitic capacitances can be obtained.

The first conductive layer CL1 is coupled between the channel regions of the first semiconductor layer SC1 through the contact hole formed in the second insulating film 12. The first auxiliary wiring line A1 is coupled to the other end of the first semiconductor layer SC1 through the contact hole formed in the second insulating film 12.

A third insulating film 13 is formed above the second insulating film 12, the signal line S1, the first conductive layer CL1, and the first auxiliary wiring line A1. The third insulating film 13 has a contact hole that faces the first conductive layer CL1 and is open to the first conductive layer CL1. The third insulating film 13 is a layer corresponding to the planarizing film PLN of FIG. 3, and is preferably formed of an organic material.

The first counter electrode CE1 is formed on the third insulating film 13. The first counter electrode CE1 is coupled to the first auxiliary wiring line A1 through the contact hole CHa1 formed in the third insulating film 13.

The counter electrode CE1 has a first opening OP1 that faces a first detection switch DS1 and that surrounds the contact hole of the third insulating film 13. The counter electrode CE1 has not only the first opening OP1, but also a plurality of openings, such as a second opening facing a second detection switch, a third opening facing a third detection switch, and a fourth opening facing a fourth detection switch.

A fourth insulating film 14 is formed above the first conductive layer CL1, the third insulating film 13, and the counter electrode CE1. The fourth insulating film 14 has a contact hole that faces the first conductive layer CL1 and is open to the first conductive layer CL1. Each of the sensor electrodes SE is formed on the fourth insulating film 14, and faces the first opening OP1. The sensor electrode SE is coupled to the first conductive layer CL1 through the first opening OP1 and the contact hole of the fourth insulating film 14.

The first detection switch DS1 including the first conductive layer CL1, the first semiconductor layer SC1, and a first switching element DS1$a$ is a specific example of the switching element according to the present invention.

The first switching element DS1$a$ includes a first electrode electrically coupled to the control line C1, a second electrode electrically coupled to the signal line S1, and a third electrode electrically coupled to the sensor electrode SE. The first electrode serves as a gate electrode of a thin-film transistor (TFT); one of the second and third electrodes serves as a source electrode thereof; and the other of the second and third electrodes serves as a drain electrode thereof. When the selection signal is supplied from a first control line C1 to the sensor electrode SE, the first switching element DS1$a$ is turned on to supply the drive signal from a first signal line S1 to the sensor electrode SE, and the detection signal is supplied to the first signal line S1.

The fingerprint sensor operates when at least the first switching element DS1$a$ is provided as a switching element for driving the fingerprint sensor. In the present embodiment, however, a second switching element DS1$b$ is additionally provided to apply the active guard potential to an unselected sensor electrode SE. The second switching element DS1$b$ includes a first electrode electrically coupled to the first control line C1, a second electrode electrically coupled to the first auxiliary wiring line A1, and a third electrode electrically coupled to the sensor electrode SE. The first electrode serves as a gate electrode of a thin-film transistor (TFT); one of the second and third electrodes serves as a source electrode thereof; and the other of the second and third electrodes serves as a drain electrode thereof. When the selection signal is supplied from the first control line C1 to the sensor electrode SE, the second switching element DS1$b$ is turned on to supply the active guard potential from the first auxiliary wiring line A1 to the sensor electrode SE.

When the first detection switch DS1 includes the first switching element DS1$a$ and the second switching element DS1$b$ coupled in series in this manner, turning on one of the switching elements turns off the other thereof. The first and the second switching elements DS1$a$ and DS1$b$ are formed of, for example, thin-film transistors of conductive types different from each other, such as an n-channel thin-film transistor and a p-channel thin-film transistor.

The first and the second switching elements DS1$a$ and DS1$b$ may have either a top-gate structure or a bottom-gate structure. The semiconductor layers of the first and the second switching elements DS1$a$ and DS1$b$ are formed of polycrystalline silicon (poly-Si), but are not limited to the polycrystalline silicon, and may be formed of, for example, amorphous silicon or oxide semiconductors.

The coupling relations between the signal line S1 and the detection switch DS1 and between the auxiliary wiring line A1 and the detection switch DS1 are not limited to those of the example described above. The second electrode of the first switching element in each detection switch DS1 may be coupled to the first auxiliary wiring line A1, and the second electrode of the second switching element in each detection switch DS1 may be coupled to the signal line S1.

1-3. Bonded Structure

Figure 5:
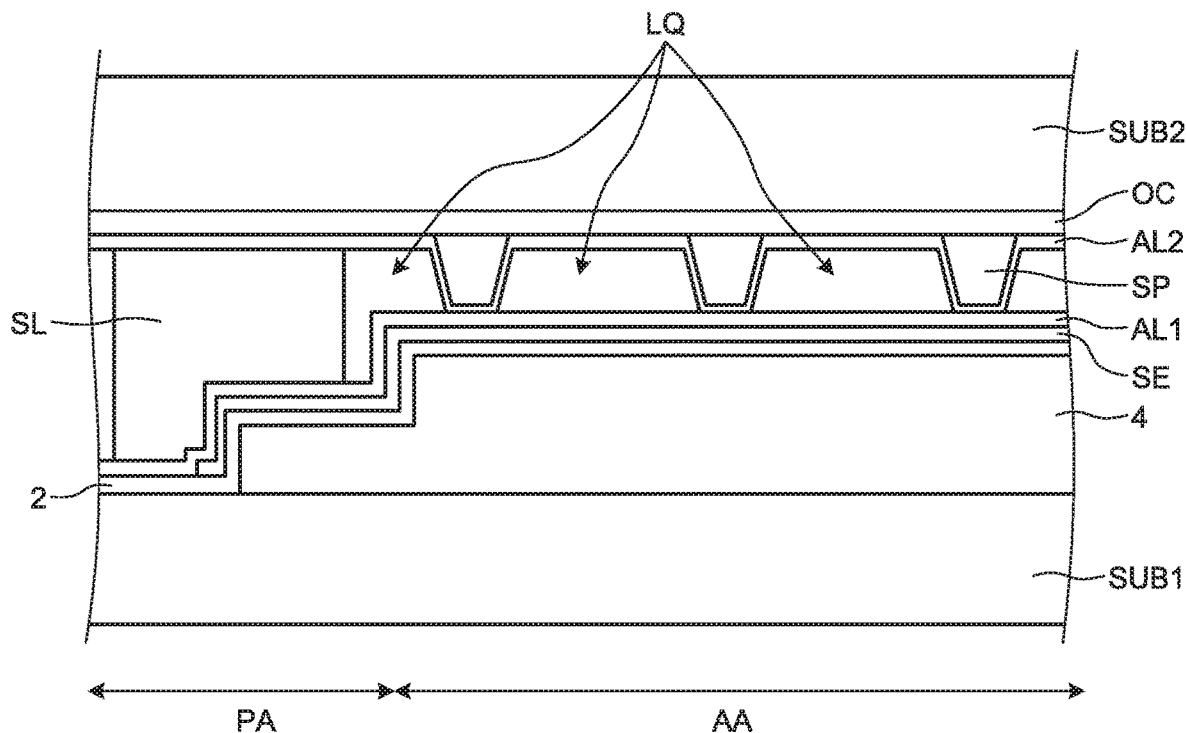
FIG. 5 is a sectional view illustrating an exemplary bonded structure of the fingerprint sensor according to the embodiment.

FIG. 5 is an exemplary schematic sectional view of a bonded structure of the fingerprint sensor according to the embodiment. The first and the second glass substrates SUB1 and SUB2 are bonded together by a sealing material SL in a region overlapping the frame region PA. When the first and the second glass substrates SUB1 and SUB2 are bonded together in the frame region PA, the gap formed between the glass substrates in the detection region AA or the like is filled with the liquid crystals of the liquid crystal layer LQ. More specifically, a first on-glass-substrate circuit 4 is formed on the first glass substrate SUB1. The insulating film 2, the sensor electrode SE, and the alignment film AL1 are sequentially stacked on the first on-glass-substrate circuit 4. The overcoat layer OC, the spacer SP, and the alignment film AL2 are sequentially stacked on the second glass substrate SUB2. The first and the second glass substrates SUB1 and SUB2 with these films formed thereon are bonded together by the sealing material SL disposed in the frame region PA.

After the glass substrates are bonded together, the liquid crystal layer LQ is filled with the liquid crystals by injecting the liquid crystals from a filling opening provided in advance in the sealing material SL, and then the filling opening is sealed.

A one-drop-fill (ODF) process may be employed in which the liquid crystals are dropped on the first glass substrate SUB1 or the second glass substrate SUB2, and after the sealing material is printed in the surrounding region of the liquid crystals, the glass substrates are laminated together, and the sealing material is hardened.

Figure 6:
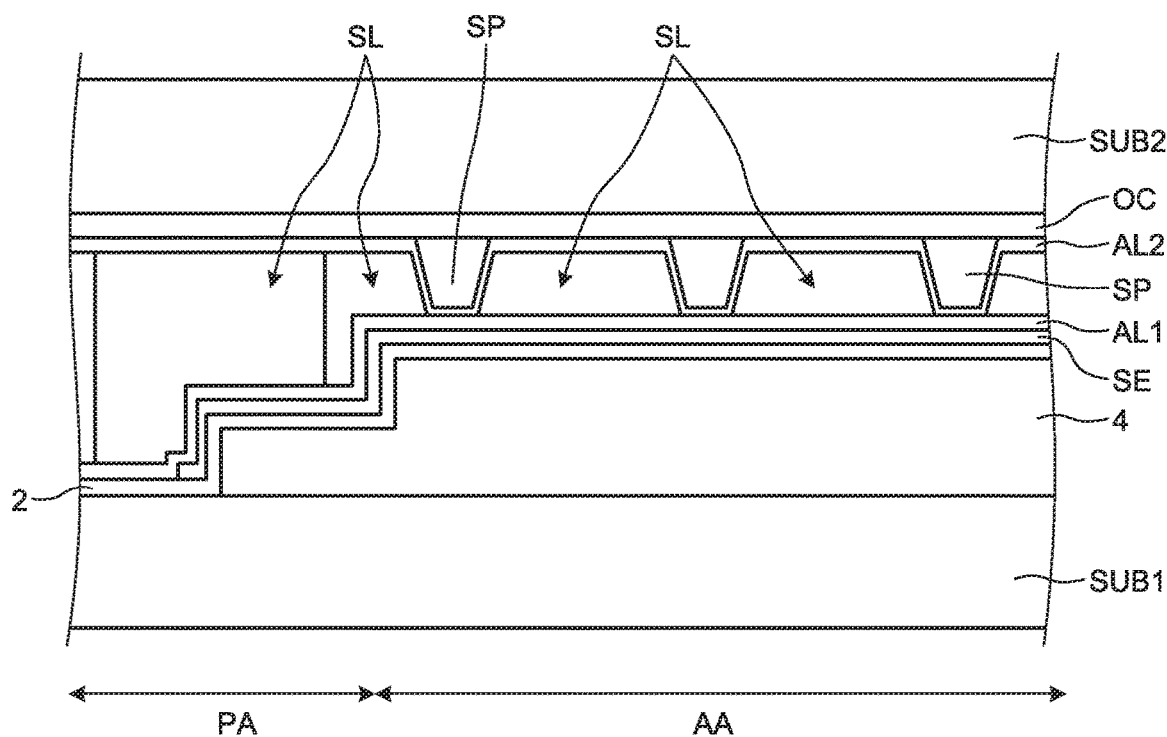
FIG. 6 is a sectional view illustrating another exemplary bonded structure of the fingerprint sensor according to the embodiment.

FIG. 6 illustrates a modification of the bonded structure of the fingerprint sensor according to the embodiment. In this modification, the gap between the first and the second glass substrates SUB1 and SUB2 is filled with the sealing material SL. In the present embodiment, the sealing material SL is disposed so as to overlap the entire surface of the frame region PA and the detection region AA, i.e., so as to overlap at least the entire surface of the second glass substrate SUB2, and bonds the first and the second glass substrates SUB1 and SUB2 together.

In this case, after an amount of the sealing material SL sufficient to spread over the entire surface of the first glass substrate SUB1 or the second glass substrate SUB2 is applied or printed thereon, the glass substrates are laminated together, and a hardening process, such as heating, is performed to bond the glass substrates together.

For example, a thermoset epoxy resin for an adhesive can be used as the sealing material SL. The use of such a sealing material can bond the two glass substrates together such that the gap therebetween is uniform over the entire region. The use of such a sealing material can bond the glass substrates together without a gap, i.e., seal the glass substrates. In FIG. 6, the alignment films AL are formed for the first and the second glass substrates SUB1 and SUB2. However, the alignment films AL need not be provided in the present modification.

Figure 7:
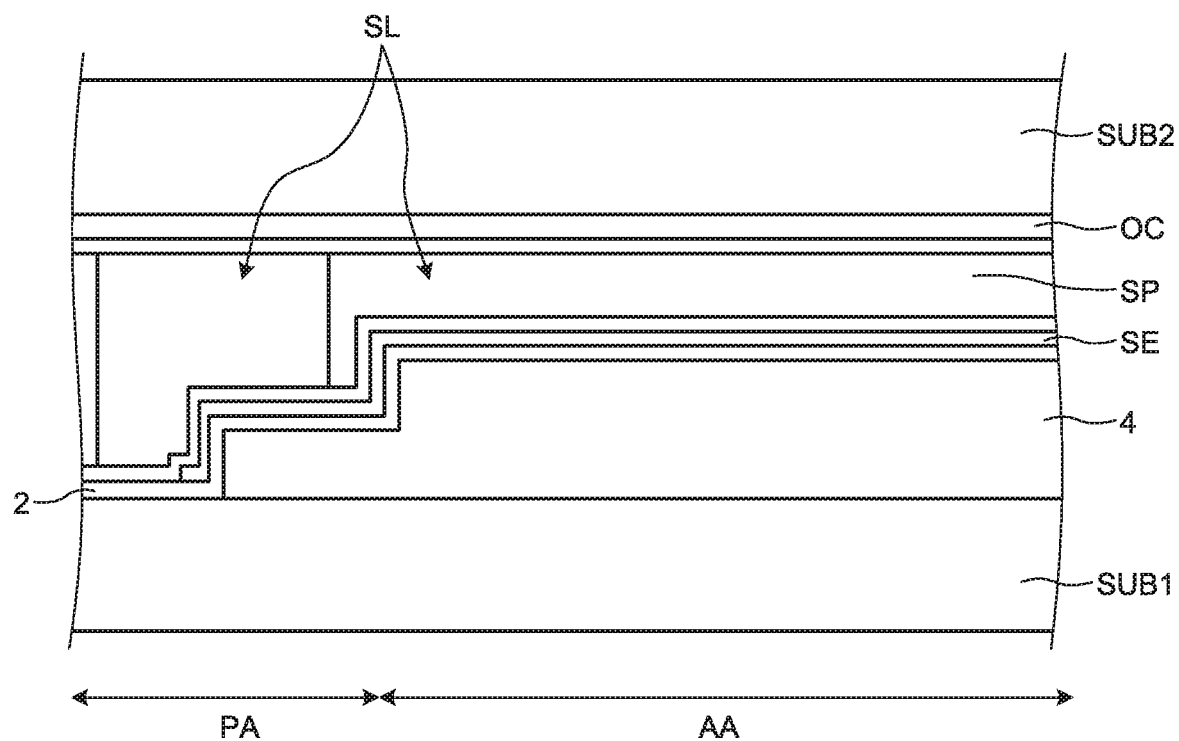
FIG. 7 is a sectional view illustrating still another exemplary bonded structure of the fingerprint sensor according to the embodiment.

FIG. 7 illustrates a modification of the bonded structure of FIG. 6. When the first and the second glass substrates SUB1 and SUB2 are bonded together by disposing the sealing material SL so as to overlap the entire surfaces of the substrates, the spacer SP need not be disposed.

When the spacer SP is disposed, an effect can be obtained that the gap between the first and the second glass substrates SUB1 and SUB2 is further uniformed over the entire region.

When the spacer SP is not disposed, air bubbles can be less likely to be generated when the gap between the first and the second glass substrates SUB1 and SUB2 is filled with the sealing material.

1-4. Detection Principle

Figure 8:
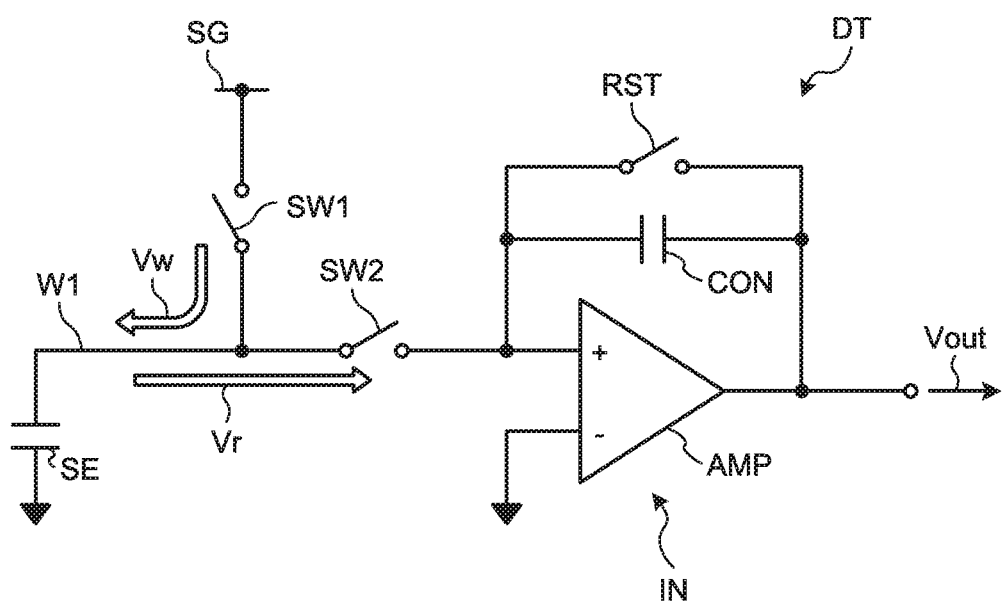
FIG. 8 is a circuit diagram illustrating an example of a detection principle of the fingerprint sensor according to the embodiment.

FIG. 8 illustrates an example of a detection principle of the fingerprint sensor according to the present embodiment. FIG. 8 is a circuit diagram illustrating a detector DT for the sensor electrode SE. In the present embodiment, the detector DT is coupled to the sensor electrode SE through a connection wiring line W1. The connection wiring line W1 and the sensor electrode SE may be coupled together through the signal line drive circuit MU (not illustrated). The number of the detectors DT is, for example, the same as the number of the connection wiring lines W1. In this case, the detectors DT are coupled to the connection wiring lines W1 on a one-to-one basis.

As illustrated in FIG. 8, the detector DT includes an integrator IN, a reset switch RST, a switch SW1, and a switch SW2. The integrator IN includes an operational amplifier AMP and a capacitor CON. In this example, the capacitor CON is coupled between the non-inverting input terminal and the output terminal of the operational amplifier AMP. The reset switch RST is coupled in parallel with the capacitor CON. The switch SW1 is coupled between a signal source SG and the connection wiring line W1. The switch SW1 switches between applying and not applying a sensor drive signal Vw from the signal source SG to the sensor electrode SE through the connection wiring line W1 and the like. The switch SW2 is coupled between the connection wiring line W1 and the non-inverting input terminal of the operational amplifier AMP. The switch SW2 switches between supplying and not supplying a detection signal Vr to the non-inverting input terminal described above.

When the detector DT described above is used, first, the switch SW1 is turned on, and the switch SW2 is turned off to write the sensor drive signal Vw to the sensor electrode SE through the connection wiring line W1 and the like. Subsequently, the switch SW1 is turned off, and then the switch SW2 is turned on to supply the detection signal Vr extracted from the sensor electrode SE through the connection wiring line W1 and the like to the non-inverting input terminal described above. The integrator IN integrates the supplied voltage (detection signal Vr) over time. Through this processing, the integrator IN can output a voltage proportional to the supplied voltage as an output signal Vout. Then, the reset switch RST is turned off to discharge a charge of the capacitor CON and thus to reset the value of the output signal Vout.

The detection principle of the present embodiment has been described by way of an example of a self-capacitance method in which the sensor drive signal Vw is written to the sensor electrode SE through the connection wiring line W1, and the detection signal Vr is read. However, the detection principle is not limited to this example.

1-5. Structure of Second Counter Electrode

Figure 9:
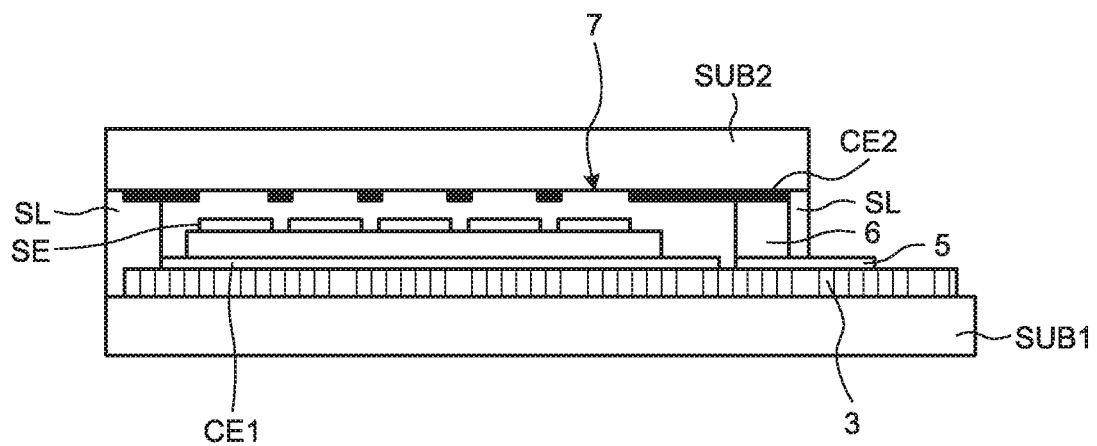
FIG. 9 is a sectional view of a second counter electrode according to the embodiment.

FIG. 9 is an exemplary schematic sectional view of a fingerprint sensor that includes a second counter electrode. A second counter electrode CE2 facing the sensor electrodes SE is formed on a first surface 7 of the second glass substrate SUB2, i.e., on a surface of the second glass substrate SUB2 closer to the first glass substrate SUB1. The second counter electrode CE2 serves as a guard electrode, and is preferably supplied with the active guard potential described above. Disposing the glass substrate above the sensor electrodes SE increases the distance between the sensor electrodes SE and the finger, and thus lowers the detection sensitivity of the sensor electrodes SE. However, the second counter electrode CE2 is disposed on the substrate which the finger comes into proximity to or contact with, i.e., on the second glass substrate SUB2, and is supplied with a potential having the same phase and amplitude as those of the drive signal, which is similar to the active guard potential. As a result, an effect is obtained that an electric field of the drive signal generated from the sensor electrodes SE is amplified above the second glass substrate SUB2, and thus the detection sensitivity of the fingerprint sensor is improved.

Interposing the glass substrate increases a distance between the sensor electrodes SE and the finger, and differentiates a distance between the sensor electrode SE and a dented portion of an uneven surface of the fingerprint on the second glass substrate SUB2 from a distance between the sensor electrode SE and a projected portion of the uneven surface thereof. Consequently, the fingerprint data obtained when the detection signal is calculated may blur. However, by disposing the second counter electrode CE2 described above and supplying thereto the potential having the same phase and amplitude as those of the drive signal, which is similar to the active guard potential, the signal intensity of the sensor can be increased, and thereby the blur of the data can be reduced. The potential supplied to the second counter electrode CE2 is preferably the same potential as that of the drive signal.

The second counter electrode CE2 is formed of ITO, but is not limited thereto, and may be formed of a metal film. The second counter electrode CE2 is coupled to a sensor circuit connection wiring line 5 through a conductive path 6. The conductive path 6 is formed of, for example, silver paste or conductive tape. The sensor circuit 3 is formed on the first glass substrate SUB1, and is coupled to the sensor circuit connection wiring line 5. The second counter electrode CE2 is supplied with the drive signal from the sensor circuit 3 through the sensor circuit connection wiring line 5. The drive signal is, however, not limited to being supplied through such a conductive path. For example, a drive signal supply circuit may be formed on the second glass substrate SUB2.

Figure 10:
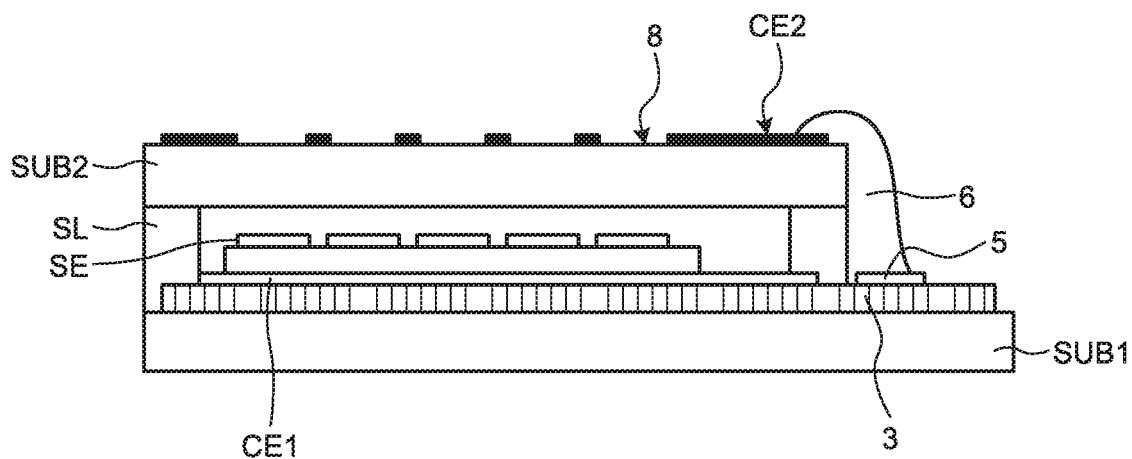
FIG. 10 is a sectional view of another example of the second counter electrode according to the embodiment.

FIG. 10 illustrates a modification of the fingerprint sensor of FIG. 9. In this modification, the second counter electrode CE2 opposed to the sensor electrodes SE is formed on a second surface 8 of the second glass substrate SUB2, i.e., on a surface of the second glass substrate SUB2 opposite to the first glass substrate. The second counter electrode CE2 thus formed on the second surface 8 of the second glass substrate SUB2 can amplify the electric field of the drive signal at a location closer to the finger, and thereby provides a higher effect of improving the detection sensitivity and the accuracy of the fingerprint sensor.

Figure 11:
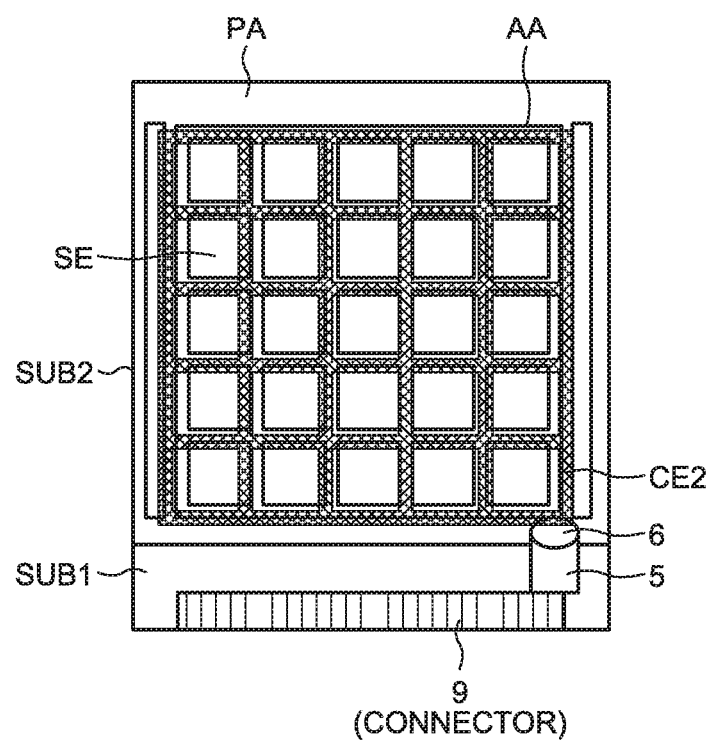
FIG. 11 is a plan view of the second counter electrode according to the embodiment.

FIG. 11 is a plan view of the second counter electrode CE2. The second counter electrode CE2 is formed to have a pattern that overlaps the second glass substrate SUB2 thereabove in the plan view, and that surrounds peripheries of the respective sensor electrodes SE so as not to overlap the sensor electrodes SE. The second counter electrode CE2 is also disposed on the frame region PA surrounding the detection region AA. The width of the second counter electrode CE2 is larger in the frame region PA than in the detection region AA. Such a pattern shape enables amplification of the drive signal generated from the sensor electrodes SE without shielding the drive signal. However, the pattern shape of the second counter electrode 2 is not limited to this pattern shape.

The sensor circuit connection wiring line 5 is coupled to a connector 9, and coupled to the sensor circuit 3 through the connector 9. The method for driving the second counter electrode CE2 is not limited to this method. The second counter electrode CE2 may be driven by a drive circuit, such as a flexible substrate, through the connector 9.

1-6. Sensor Drive Electrode on Second Glass Substrate

Figure 12:
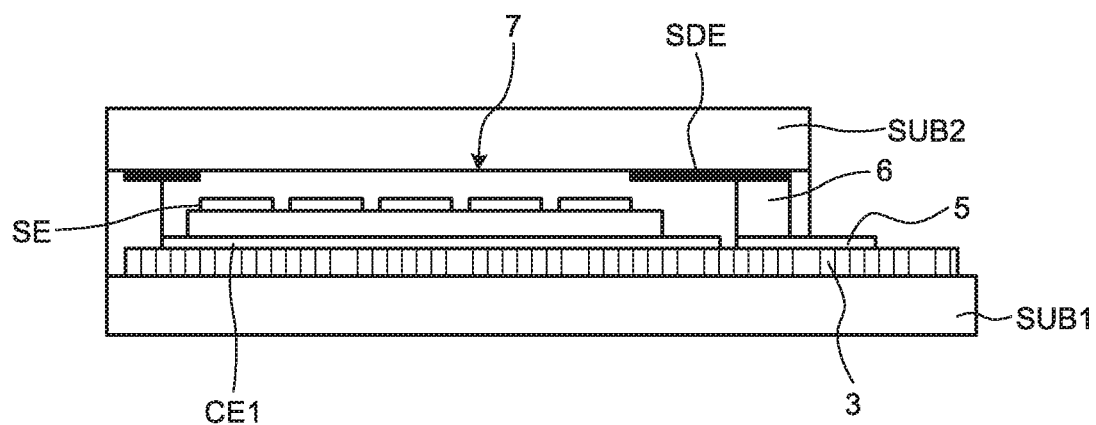
FIG. 12 is a sectional view of a sensor drive electrode according to the embodiment.

FIG. 12 is an exemplary sectional view of a sensor drive electrode SDE disposed on the second glass substrate SUB2. In FIG. 12, the sensor drive electrode SDE is formed on the first surface 7 of the second glass substrate SUB2 (on a surface thereof closer to the first glass substrate SUB1).

The sensor drive electrode SDE is coupled to the sensor circuit connection wiring line 5 through the conductive path 6. The sensor drive electrode SDE can be supplied with the drive signal from the sensor circuit 3 through the sensor circuit connection wiring line 5. However, the drive signal is not limited to being supplied in this manner. A drive signal supplying power source may be disposed on the second glass substrate.

The drive signal is transmitted from the sensor drive electrode SDE, and the sensor electrode SE receives the drive signal as a received signal through the finger. The fingerprint in proximity to or contact with the fingerprint sensor can be recognized based on the received signal. That is, the sensor electrode SE serves as a detection electrode in this case.

Figure 13:
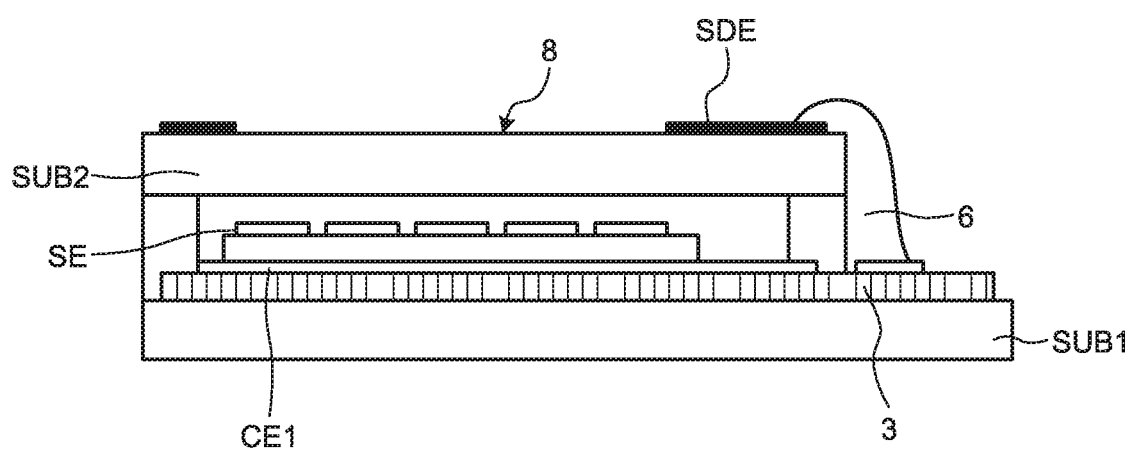
FIG. 13 is a sectional view of another example of the sensor drive electrode according to the embodiment.

FIG. 13 illustrates a modification of the sensor drive electrode of FIG. 12. In FIG. 13, the sensor drive electrode SDE is formed on the second surface 8 of the second glass substrate SUB2. This modification improves the detection sensitivity of the fingerprint sensor because the sensor drive electrode SDE is closer to the finger.

Figure 14:
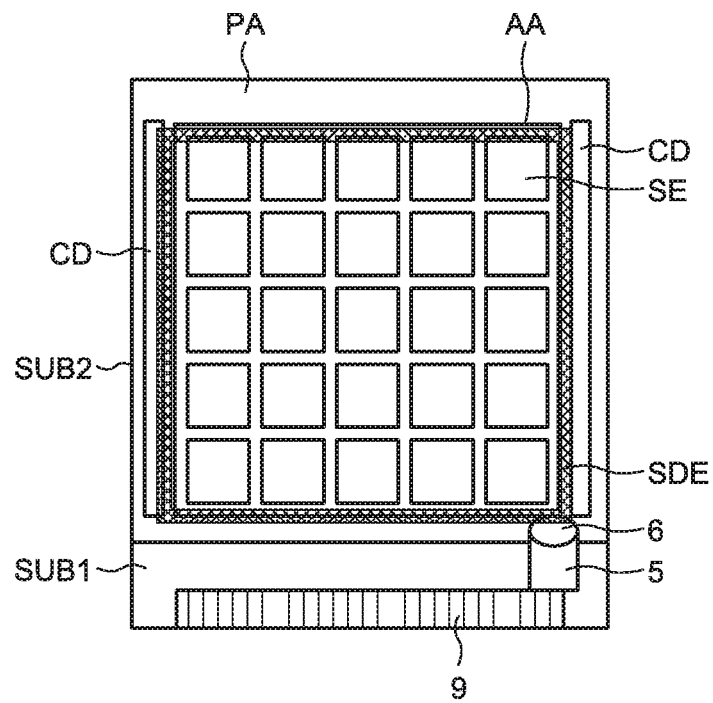
FIG. 14 is a plan view of the sensor drive electrode according to the embodiment.

FIG. 14 is a plan view of the sensor drive electrode SDE on the second glass substrate. The sensor drive electrode SDE is formed in the frame region PA of the fingerprint sensor 1 so as to surround the detection region AA. The sensor drive electrode SDE can be formed of ITO, IZO, ZnO, or a metal film, for example.

Figure 15:
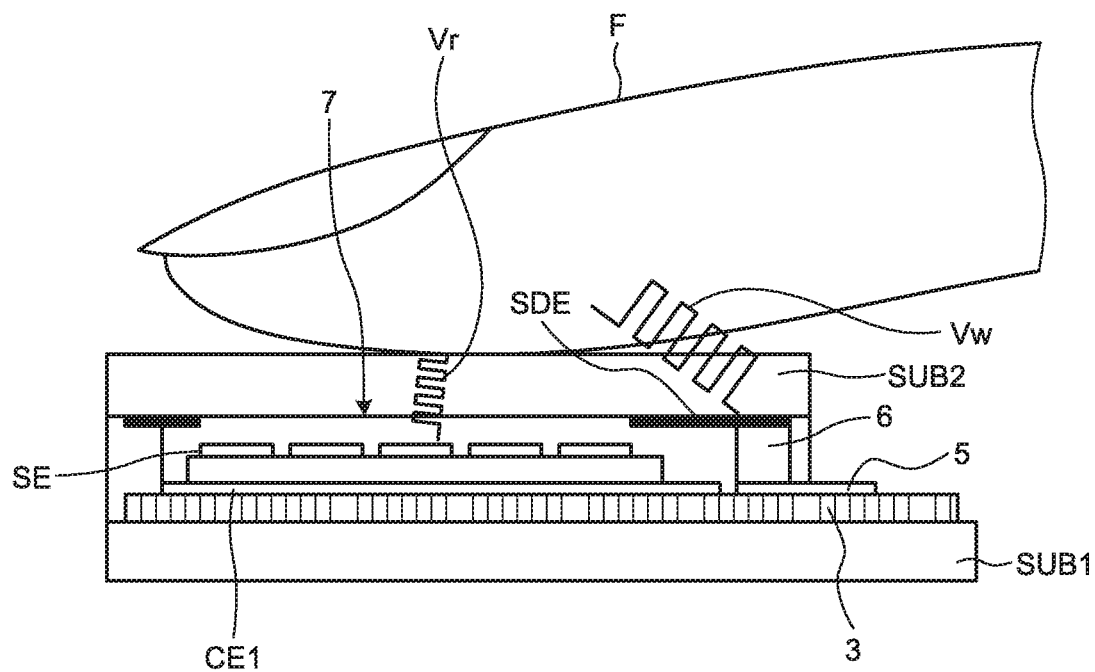
FIG. 15 is a diagram illustrating an example of a detection principle of the sensor drive electrode according to the embodiment.

FIG. 15 illustrates an example of a detection principle of the present embodiment. An RF method is an example of a method for detecting the fingerprint by using the sensor drive electrode SDE as a drive electrode and the sensor electrode SE as a detection electrode. In the capacitance method described above, the fingerprint is detected based on the difference in capacitance change caused by the unevenness of the surface of the finger F. In the RF method, a high-frequency drive signal is transmitted to the conductive dermis lying under the epidermis of the finger, and an electric field generated by dermal cells is detected as a detection signal. In FIG. 15, the drive electrode SDE transmits the high-frequency sensor drive signal Vw. A change caused by the electric field indicating information on the microstructure of the dermal cells of the finger F is added to the sensor drive signal Vw to obtain the detection signal Vr, and the detection electrode (sensor electrode SE in this example) receives the detection signal Vr. However, the principle for detecting the microstructure, such as that of the fingerprint, by using the sensor drive electrode SDE and the sensor electrodes SE is not limited to the above example.

1-7. Method for Driving Fingerprint Sensor

Figure 16:
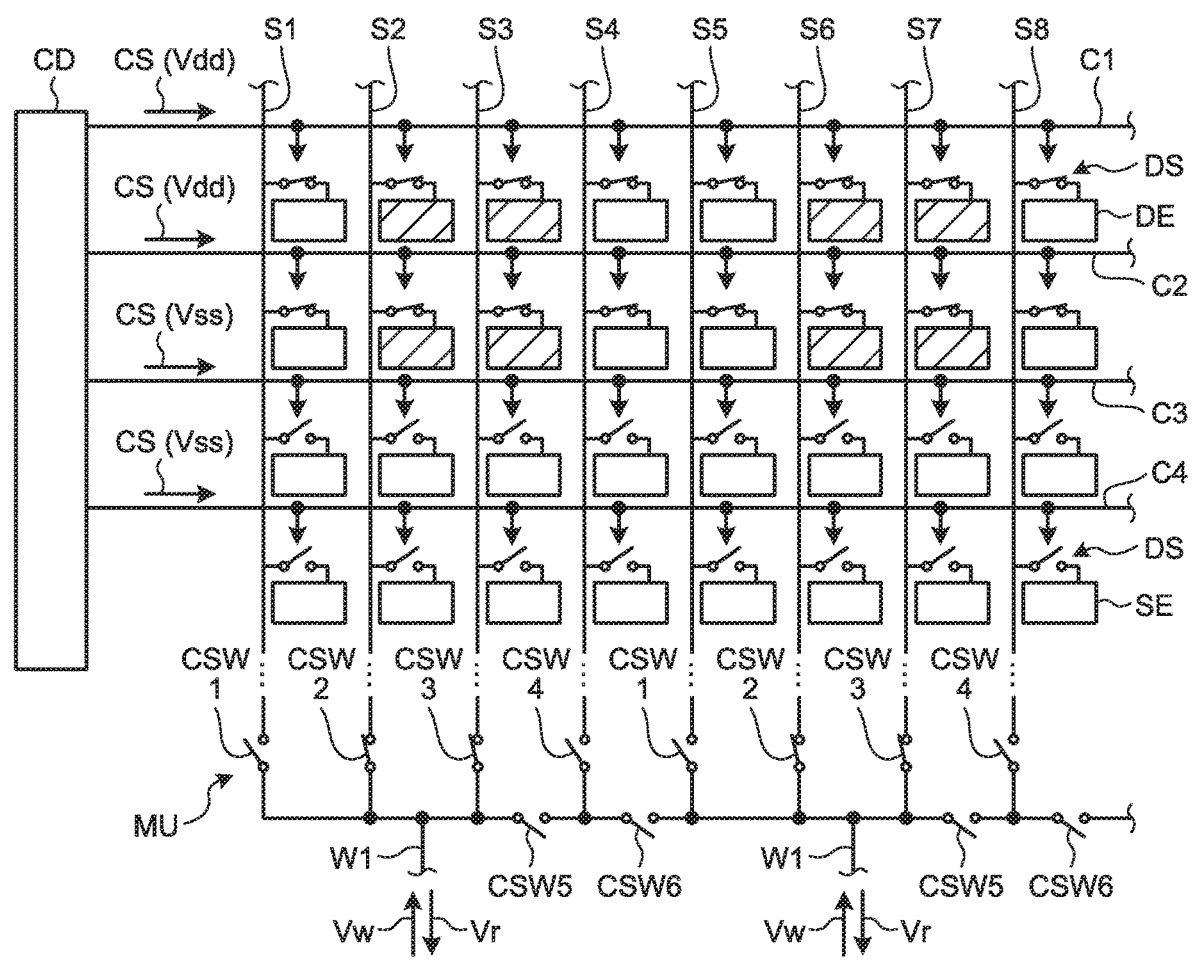
FIG. 16 is a schematic diagram illustrating a method for driving the fingerprint sensor according to the embodiment.

FIG. 16 is an exemplary circuit diagram for illustrating a method for driving the fingerprint sensor according to the present embodiment. In FIG. 16, under the control of a controller CU (not illustrated), the control line drive circuit CD simultaneously supplies a drive signal CS at an on level (power supply voltage Vdd) to a first control line C1 and a second control line C2, and supplies the drive signal CS at an off level (power supply voltage Vss) to control lines C3 and C4 other than the first and the second control lines C1 and C2.

The on-level drive signal CS (power supply voltage Vdd) is a selection signal for the control lines C, and the off-level drive signal CS (power supply voltage Vss) is a non-selection signal for the control lines C. As a result, the detection switches DS in the first and the second rows are brought into a conduction state. In the signal line drive circuit MU, a second control switch CSW2 and a third control switch CSW3 are brought into the conduction state, and a first control switch CSW1 and a fourth control switch CSW4 are brought into a non-conduction state. A sixth control switch CSW6 is also brought into the non-conduction state.

As a result, four adjacent sensor electrodes SE shaded with diagonal lines among the sensor electrodes SE in the first and the second rows are electrically bundled, and brought into a selected state. The sensor drive signal Vw is supplied to a second signal line S2, a third signal line S3, a sixth signal line S6, and a seventh signal line S7 among first to eighth signal lines S1 to S8. As a result, it is possible to collectively perform writing of the sensor drive signal Vw and reading of the detection signal Vr to and from the four bundled sensor drive electrodes SE through one connection wiring line W1.

In a subsequent sensing period, the signal line drive circuit MU, for example, brings the second and the third control switches CSW2 and CSW3 into the conduction state, and brings the first, the fourth, and the sixth control switches CSW1, CSW4 and CSW6 into the non-conduction state, whereby the electric bundle of the four adjacent sensor electrodes SE can be shifted rightward by one signal line. In this manner, the operation of detection is repeated while shifting the sensor electrodes SE at a predetermined pitch, and obtained output signals are added to obtain a calculation result, whereby high-resolution fingerprint data with less blur can be obtained.

Ends of the connection wiring lines W1 are coupled to the controller CU (not illustrated). The controller CU controls various control signals and the selection signal, and may include, for example, a circuit for detecting the detection signal, a circuit for calculating the output result, a power source for supplying the drive signal, and an analog front-end (AFE) that performs digitalization of the detection signal or the like.

Figure 17:
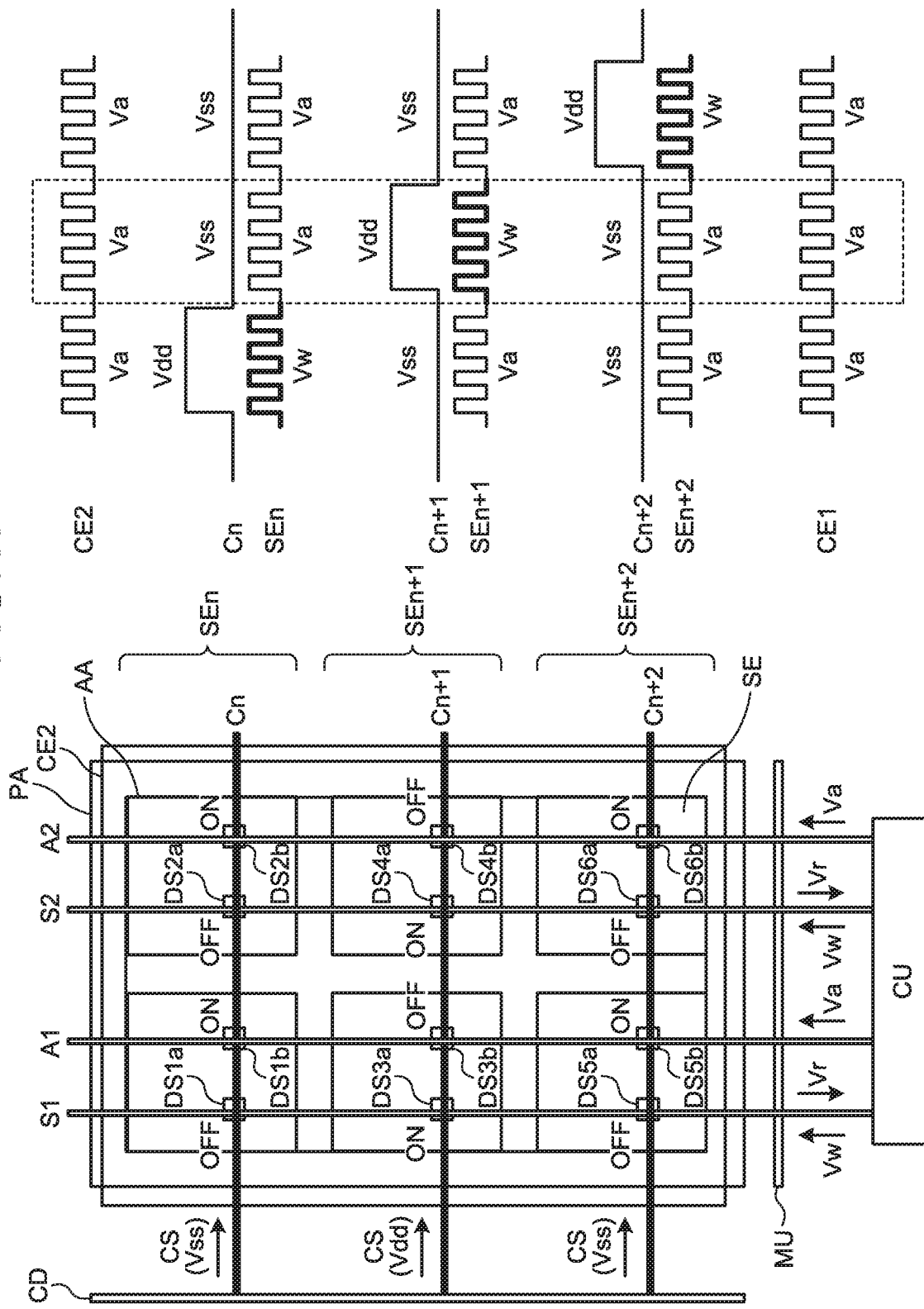
FIG. 17 is a schematic diagram and a timing diagram illustrating a method for driving the second counter electrode according to the embodiment.

FIG. 17 illustrates the method for driving the self-capacitance fingerprint sensor that includes the first and the second counter electrodes. In FIG. 17, the sensor electrodes SE are coupled to respective switching elements DS1a to DS6a that are coupled to the signal line S1 or S2, and to respective switching elements DS1b to DS6b that are coupled to an auxiliary wiring line A1 or A2. The control line drive circuit CD supplies the on-level drive signal CS (power supply voltage Vdd) or the off-level drive signal CS (power supply voltage Vss) to the control lines C. In the circuit of FIG. 17, the control line drive circuit CD selects one control line C to be driven by sequentially supplying the on-level drive signal CS (power supply voltage Vdd) to the control lines C row by row, and supplies the off-level drive signal CS (power supply voltage Vss) to unselected control lines C. Each of the control lines C is coupled to switching elements that are coupled to the respective sensor electrodes SE belonging to one row. The switching elements DS3a and DS4a electrically connect the respective sensor electrodes SE to the signal line S1 or S2, and the switching elements DS3b and DS4b electrically disconnect the respective sensor electrodes SE from the auxiliary wiring line A1 or A2. The switching elements DS3a and DS4a and the switching elements DS3b and DS4b are coupled to the control line C supplied with the on-level drive signal CS (power supply voltage Vdd). The switching elements DS1a, DS2a, DS5a, and DS6a electrically disconnect the respective sensor electrodes SE from the signal line S1 or S2, and the switching elements DS1b, DS2b, DS5b, and DS6b electrically connect the respective sensor electrodes SE to the auxiliary wiring line A1 or A2. The switching elements DS1a, DS2a, DS5a, and DS6a and the switching elements DS1b, DS2b, DS5b, and DS6b are coupled to the respective control lines C supplied with the off-level drive signal CS (power supply voltage Vss).

In FIG. 17, the signal lines S are supplied with the sensor drive signal Vw through the signal line drive circuit MU, and the auxiliary wiring line A is supplied with an active guard potential Va from the controller CU through the signal line drive circuit MU. That is, the sensor electrodes SE belonging to the control line C supplied with the on-level drive signal CS (power supply voltage Vdd) are supplied with the sensor drive signal Vw through the signal line drive circuit MU, and output the detection signal Vr. The sensor electrodes SE belonging to the control lines C supplied with the off-level drive signal CS (power supply voltage Vss) are supplied with the active guard potential Va through the signal line drive circuit MU.

In the timing diagram on the right side of FIG. 17, the on-level drive signal CS (power supply voltage Vdd) is supplied to the control lines Cn, Cn+1, and Cn+2 at different timing, so that the row of the sensor electrodes SE selected to be driven is shifted one by one. The left-hand diagram of FIG. 17 illustrates the connection state (connection state at timing enclosed by dotted line in the right-hand diagram) when the control line Cn+1 is selected. The control line Cn+1 is supplied with the on-level drive signal CS (power supply voltage Vdd), and a group SEn+1 of two adjacent sensor electrodes SE is selected. As a result, the sensor electrodes SEn+1 are supplied with the sensor drive signal Vw from the controller CU through the signal line drive circuit MU, and sensor electrodes SEn and sensor electrodes SEn+2 are supplied with the guard signal Va. The first counter electrode CE1 (not illustrated in FIG. 17) is disposed so as to face the sensor electrodes SE and overlap the entire surface of the detection region AA. The second counter electrode CE2 is disposed along outer peripheries of the sensor electrodes SE so as to overlap a part of the detection region AA and the frame region PA that do not overlap the sensor electrodes SE. The first counter electrode CE1 and the second counter electrode CE2 are supplied with the active guard potential Va that has the same phase and amplitude as those of the sensor drive signal Vw during the entire detection period of the fingerprint sensor for any of the control lines C, in synchronization with the sensor drive signal Vw.

Figure 18:
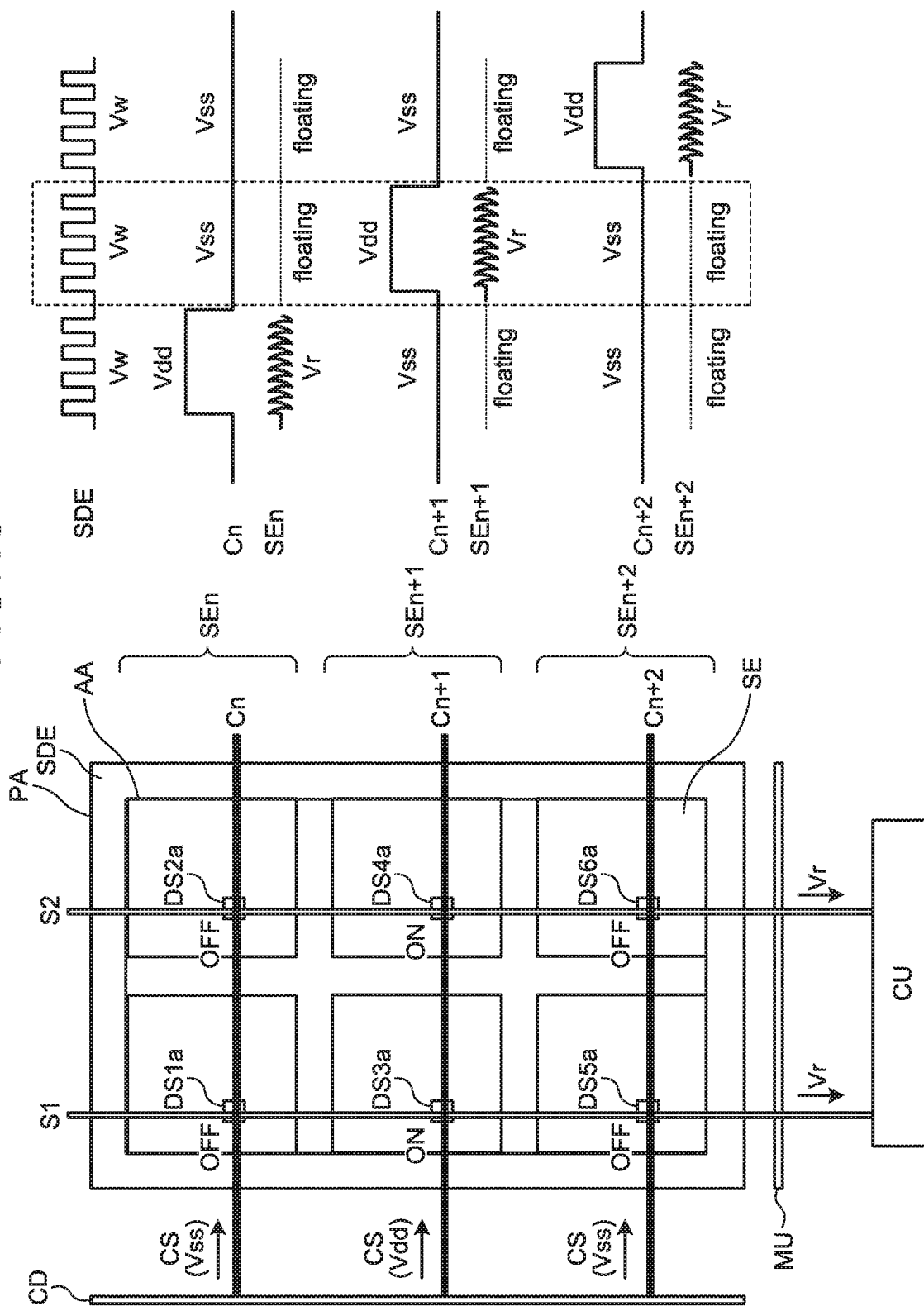
FIG. 18 is a schematic diagram and a timing diagram illustrating a method for driving the sensor drive electrode according to the embodiment.

FIG. 18 illustrates the RF method for driving the fingerprint sensor that includes the sensor drive electrode. In FIG. 18, the sensor electrodes SE are coupled to the respective switching elements DS1a to DS6a that are coupled to the signal line S1 or S2.

Each of the switching elements DS1a to DS6a includes an n-type thin-film transistor. The control line drive circuit CD supplies the on-level drive signal CS (power supply voltage Vdd) or the off-level drive signal CS (power supply voltage Vss) to the control lines C. In the circuit of FIG. 18, the control line drive circuit CD selects one control line C to be driven by sequentially supplying the on-level drive signal CS (power supply voltage Vdd) to the control lines C row by row, and supplies the off-level drive signal CS (power supply voltage Vss) to unselected control lines.

Each of the control lines C is coupled to switching elements that are coupled to the respective sensor electrodes SE belonging to one row. The switching elements DS3a and DS4a coupled to the control line C supplied with the on-level drive signal CS (power supply voltage Vdd) electrically connect the respective sensor electrodes SE to the signal line S1 or S2, and the switching elements DS1a, DS2a, DS5a, and DS6a coupled to the control lines C supplied with the off-level drive signal CS (power supply voltage Vss) electrically disconnect the respective sensor electrodes SE from the signal line S1 or S2. The sensor electrode SE outputs the detection signal Vr to the signal line drive circuit MU and the controller CU through the signal lines S.

In the timing diagram on the right side of FIG. 18, the on-level drive signal CS (power supply voltage Vdd) is supplied to the control lines Cn, Cn+1, and Cn+2 at different timing, so that the row of the sensor electrodes SE selected to be detected is shifted one by one. The left-hand diagram of FIG. 18 illustrates the connection state (connection state at timing enclosed by dotted line in the right-hand diagram) when the control line Cn+1 is selected. The control line Cn+1 is supplied with the on-level drive signal CS (power supply voltage Vdd), and the group SEn+1 of two adjacent sensor electrodes SE is selected. As a result, the detection signal Vr is output from the sensor electrodes SEn+1 to the controller CU through the signal line drive circuit MU.

In FIG. 18, the sensor drive electrode SDE is disposed along the frame region PA. The sensor drive electrode SDE is supplied with the sensor drive signal Vw during the entire detection period of the fingerprint sensor for any of the control lines C.

The sensor electrode SE belonging to the selected control line receives an electromagnetic wave supplied from the sensor drive electrode SDE through the finger, and outputs the detection signal Vr to the signal lines S. The controller CU includes the detector DT (not illustrated), and detects the detection signal Vr from the sensor electrode SE.

In FIG. 18, the sensor electrodes SE belonging to the rows of the unselected control lines (control lines supplied with the off-level drive signal CS) are not coupled to the signal lines S, i.e., not coupled to the detection circuit, and are consequently set at the floating potential.

1-8. Method for Manufacturing Fingerprint Sensor

In the fingerprint sensor according to the present embodiment, the two glass substrates interpose the sensor electrodes SE therebetween, and are bonded together without a gap, i.e., sealed by the sealing material. Thereafter, the glass substrates are wet-etched to be subjected to dissolution, and thus can be reduced in film thickness. That is, the two glass substrates are sealed by the sealing material, and then are immersed in an etching solution to be adjusted to have a desired film thickness. The two glass substrates are preferably adjusted to each have a film thickness in the range of 100 µm to 300 µm. The liquid crystals can be injected between the two glass substrates before the etching process. Then, the glass substrates are cut as needed. Employing this method makes it possible to manufacture a thinner fingerprint sensor with higher detection sensitivity, and also a smaller and lighter fingerprint sensor. A known polishing method or etching method can be used as the method for adjusting the film thickness of the glass substrates. Using the wet etching method is preferable because it makes the glass hard to be cracked.

1-9. Fingerprint Sensor Module

Figure 19:
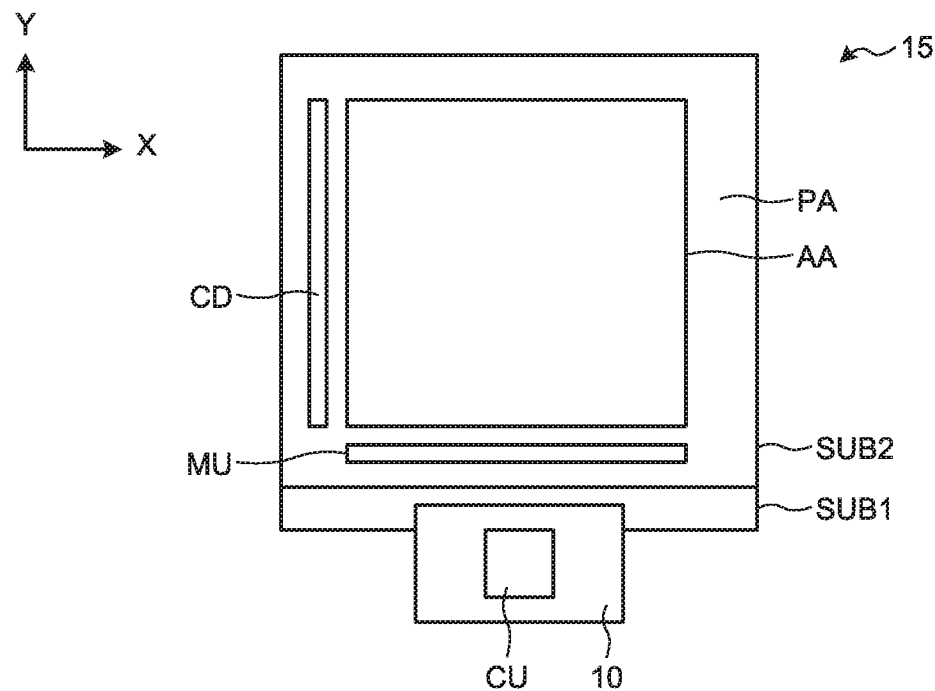
FIG. 19 is an exemplary plan view of a fingerprint sensor module according to the embodiment.
Figure 20:
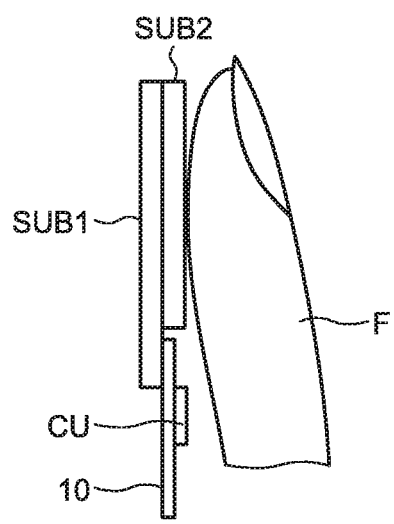
FIG. 20 is an exemplary side view of the fingerprint sensor module according to the embodiment.

FIG. 19 is an exemplary schematic plan view of a fingerprint sensor module 15 according to the present embodiment. FIG. 20 is an exemplary schematic side view of the fingerprint sensor module 15 according to the present embodiment. The fingerprint sensor module 15 includes a flexible substrate 10 coupled onto the first glass substrate SUB1 included in the fingerprint sensor 1 and the controller CU disposed on the flexible substrate 10. The controller CU is a component that can transmit and receive signals and data between external equipment and the fingerprint sensor. The controller CU includes, for example, the detector DT that receives the detection signal Vr output from the signal lines S through the signal line drive circuit MU. The controller CU may include an analog front-end (AFE) that performs data conversion on the detection signal Vr.

The controller CU may be disposed on the first glass substrate SUB1. The signal line drive circuit MU and the control line drive circuit CD may be included in the controller CU disposed on the flexible substrate 10, instead of being disposed on the first glass substrate. The signal lines S coupled to the respective sensor electrodes SE are coupled from the signal line drive circuit MU to the controller CU through the connection wiring line W1 (not illustrated).

When the fingerprint sensor module 15 is built into an electronic apparatus, such as a personal computer, a mobile phone, a tablet, and a card with a biometric authentication function, through the controller CU disposed on the flexible substrate 10, the fingerprint sensor module 15 can exchange any selection signal, any control signal, and any synchronization signal between the controller CU and an operating system (OS) or an application processor of the electronic apparatus so as to allow the OS to easily control the fingerprint sensor. The detection data detected by the detector DT is transmitted through the controller CU to, for example, the application processor of the electronic apparatus so as to perform image conversion from the detection data into certain fingerprint data, perform data correction processing, and perform association with any system or software for authentication in an easy way. The controller CU may perform synchronization among modules or processing of the detection data by transmitting and receiving signals, for example, to and from a display circuit control driver of a display device incorporating the fingerprint sensor module 15, or to and from a touch detection driver of a touchscreen (touchscreen larger than the fingerprint sensor) incorporating the fingerprint sensor 1. The fingerprint sensor module 15 that is reduced in thickness and size and increased in durability in this manner can be easily incorporated in any electronic apparatus, and achieves lower manufacturing cost and higher versatility than in the case of directly integrating the fingerprint sensor into the electronic apparatus.

1-10. Decorative Layer

The fingerprint sensor according to the present invention may also include a decorative layer.

Figure 21:
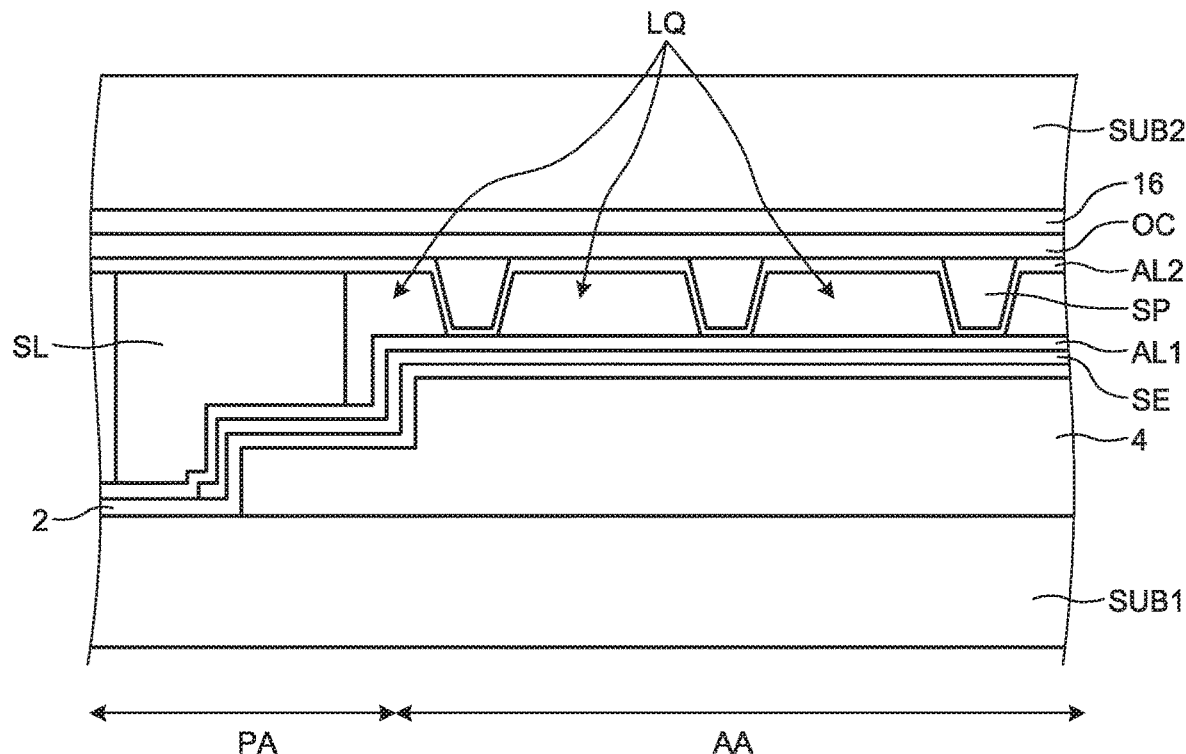
FIG. 21 is a sectional view of a decorative layer according to the embodiment.

FIG. 21 illustrates an exemplary sectional view of the decorative layer according to the present embodiment. In FIG. 21, a decorative layer 16 is disposed between the second glass substrate SUB2 and the overcoat layer OC so as to overlap the entire surface of the second glass substrate SUB2. The decorative layer may also serve as the overcoat layer.

Figure 22:
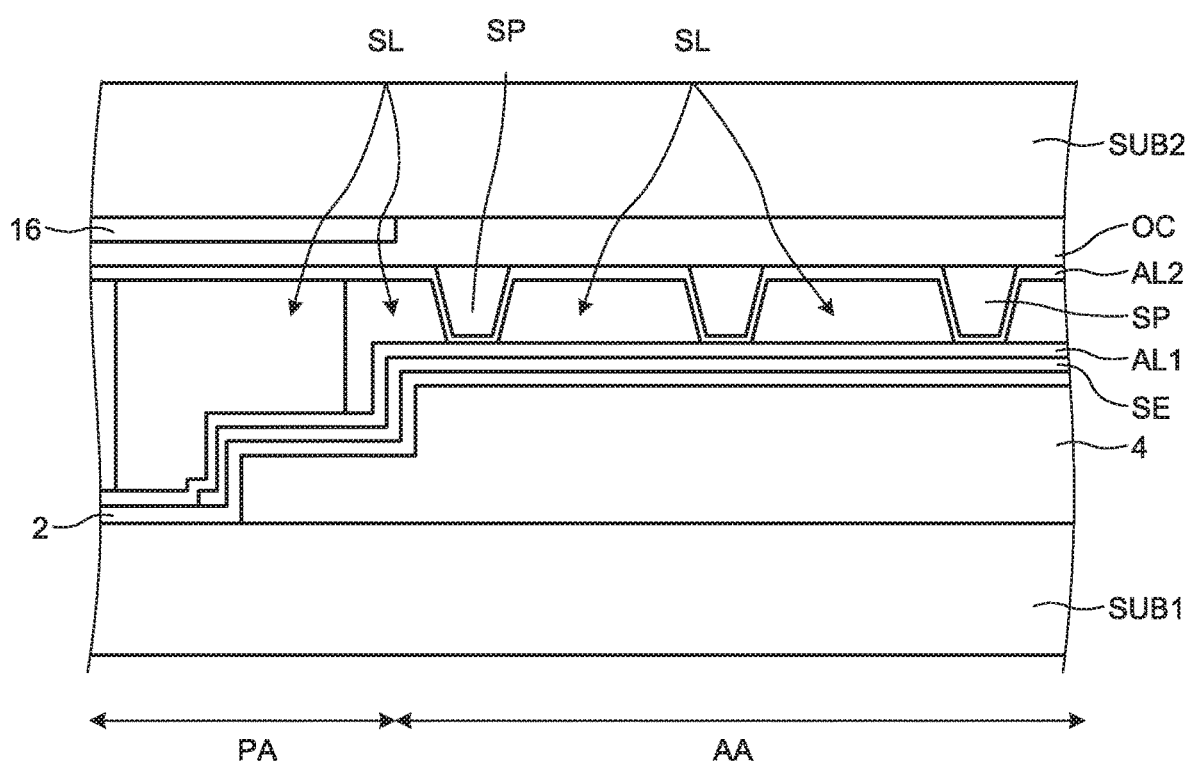
FIG. 22 is another exemplary sectional view of the decorative layer according to the embodiment.

The decorative layer 16 may be disposed so as to overlap only the frame region PA, as illustrated in FIG. 22. Any colored layer can be used as the decorative layer 16. The decorative layer 16 may be a black matrix layer.

Figure 23:
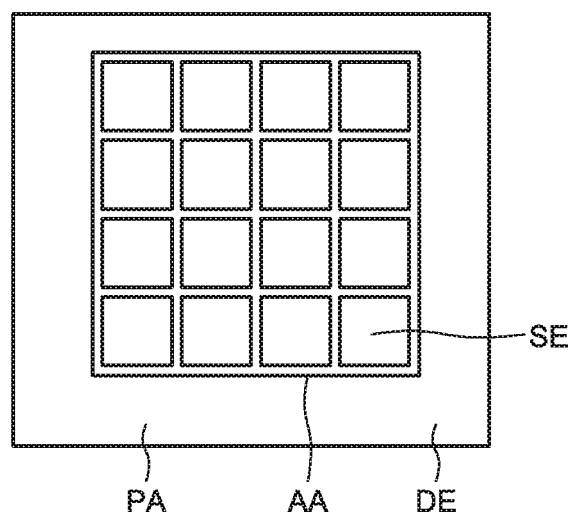
FIG. 23 is an exemplary plan view of a dummy electrode according to the embodiment.

FIG. 23 illustrates a plan view of a dummy electrode DE formed in the frame region PA. The dummy electrode DE may be formed as the same layer as the sensor electrodes SE. The dummy electrode DE may be formed so as to overlap the decorative layer 16 disposed in the frame region PA. The dummy electrode may be supplied with the active guard potential.

1-11. Other Functions

The fingerprint sensor according to the present invention can be used not only as a sensor for the fingerprint detection, but also as a small thin sensor for detecting biological microstructures.

What is claimed is:

1. A fingerprint sensor comprising:
   a substrate;
   a plurality of sensor electrodes arranged in a matrix on the substrate;
   a plurality of first switches coupled to the sensor electrodes;
   a control line drive circuit that is provided and long in a first direction;
   a signal line drive circuit that is provided and long in a second direction orthogonal to the first direction;
   a plurality of signal lines coupling the signal line drive circuit to the sensor electrodes through the first switches;
   a plurality of control lines transmitting a selection signal to the first switches from the control line drive circuit;
   a sensor drive electrode surrounding the matrix of the sensor electrodes;
   a plurality of second switches that are provided between the signal line drive circuit and the signal lines and in a one-to-one correspondence with the signal lines; and
   a predetermined number of third switches that are provided between the signal line drive circuit and the predetermined number of second switches of all the second switches and in a one-to-one correspondence with the predetermined number of second switches,
   wherein a distance of the sensor drive electrode from a surface of the substrate is larger than a distance of the sensor electrodes from the surface of the substrate,
   wherein the predetermined number is less than the number of all the second switches, and
   wherein the second switches and the third switches are configured to be individually switched between a conduction state and a non-conduction state.

2. The fingerprint sensor according to claim 1, further comprising:
   an organic layer covering the sensor electrodes,
   wherein a position of a surface of the organic layer is lower than a position of the sensor drive electrode.

3. The fingerprint sensor according to claim 2, further comprising:
   a counter electrode covering the signal lines and the control lines,
   wherein the counter electrode overlaps the sensor electrodes.

4. The fingerprint sensor according to claim 3,
   wherein the sensor electrodes are made of transparent electrodes.

5. The fingerprint sensor according to claim 3,
   wherein the counter electrode is made of a transparent electrode.

* * * * *